United States Patent
Kim et al.

(10) Patent No.: US 10,949,310 B2
(45) Date of Patent: Mar. 16, 2021

(54) PHYSIO-LOGICAL LOGGING FOR IN-MEMORY ROW-ORIENTED DATABASE SYSTEM

(71) Applicant: SAP SE, Walldorf (DE)

(72) Inventors: Hyeong Seog Kim, Seoul (KR); Yong Sik Kwon, Seoul (KR); Seyeong Bae, Seoul (KR); Ji Hoon Jang, Seoul (KR); Won Wook Hong, Seoul (KR)

(73) Assignee: SAP SE, Walldorf (DE)

( * ) Notice: Subject to any disclaimer, the term of this patent is extended or adjusted under 35 U.S.C. 154(b) by 958 days.

(21) Appl. No.: 15/362,714

(22) Filed: Nov. 28, 2016

(65) Prior Publication Data

US 2018/0150363 A1    May 31, 2018

(51) Int. Cl.
G06F 16/23    (2019.01)
G06F 11/14    (2006.01)

(52) U.S. Cl.
CPC ...... *G06F 11/1469* (2013.01); *G06F 16/2308* (2019.01); *G06F 16/2365* (2019.01); *G06F 2201/84* (2013.01)

(58) Field of Classification Search
CPC ............. G06F 11/1469; G06F 16/2308; G06F 16/2365; G06F 2201/84
See application file for complete search history.

(56) References Cited

U.S. PATENT DOCUMENTS

| | | | |
|---|---|---|---|
| 6,351,753 B1 * | 2/2002 | Jagadish | G06F 16/2329 |
| 8,364,648 B1 * | 1/2013 | Sim-Tang | G06F 16/20 |
| | | | 707/674 |
| 10,708,379 B1 * | 7/2020 | Gupta | H04L 67/2838 |
| 2005/0198647 A1 | 9/2005 | Hipp et al. | |
| 2006/0074977 A1 * | 4/2006 | Kothuri | G06F 16/2246 |
| 2011/0271067 A1 * | 11/2011 | Chou | G06F 11/1464 |
| | | | 711/162 |
| 2011/0307674 A1 | 12/2011 | Ryu et al. | |
| 2012/0066546 A1 * | 3/2012 | Kim | G06F 11/1417 |
| | | | 714/15 |

(Continued)

OTHER PUBLICATIONS

Extended European Search Report for European Patent Application No. 17001374.2, dated Mar. 6, 2018 (7 pages).

*Primary Examiner* — Mark D Featherstone
*Assistant Examiner* — Navneet Gmahl
(74) *Attorney, Agent, or Firm* — Jones Day

(57) ABSTRACT

Restoring a database image of a secondary database system comprises initializing the database image from a recovery image that includes metadata logs and non-metadata logs, of which at least one metadata log includes an undo log of non-committed data that is applied to the initialized database image. A first pagelist and first indexes are then rebuilt based on first data segments of the database image and the corresponding metadata objects. The database image is then updated by replaying the metadata redo log generated from the undo log, the metadata logs, and the non-metadata logs. Then, a second pagelist and second indexes for the database system are rebuilt based on second data segments of the database image and the corresponding non-metadata objects, while each of the first data segments is statically separated from the second data segments in physical memory space. Related apparatus, systems, techniques and articles are also described.

20 Claims, 9 Drawing Sheets

(56) References Cited

U.S. PATENT DOCUMENTS

| | | | |
|---|---|---|---|
| 2013/0262800 A1* | 10/2013 | Goodman | G06F 16/128 711/162 |
| 2014/0095452 A1* | 4/2014 | Lee | G06F 11/1471 707/683 |
| 2014/0149696 A1* | 5/2014 | Frenkel | G06F 9/45558 711/162 |
| 2014/0201159 A1* | 7/2014 | Kumarasamy | G06F 11/1469 707/679 |
| 2014/0279900 A1* | 9/2014 | Gupta | G06F 16/219 707/634 |
| 2014/0279920 A1* | 9/2014 | Madhavarapu | G06F 11/1458 707/649 |
| 2016/0042028 A1* | 2/2016 | Faerber | G06F 16/162 707/607 |
| 2016/0070726 A1* | 3/2016 | Macnicol | G06F 16/245 707/691 |
| 2016/0147786 A1* | 5/2016 | Andrei | G06F 16/1756 707/695 |
| 2017/0024315 A1* | 1/2017 | Leshinsky | G06F 12/0253 |
| 2018/0144015 A1* | 5/2018 | Mittur Venkataramanappa | G06F 16/273 |

\* cited by examiner

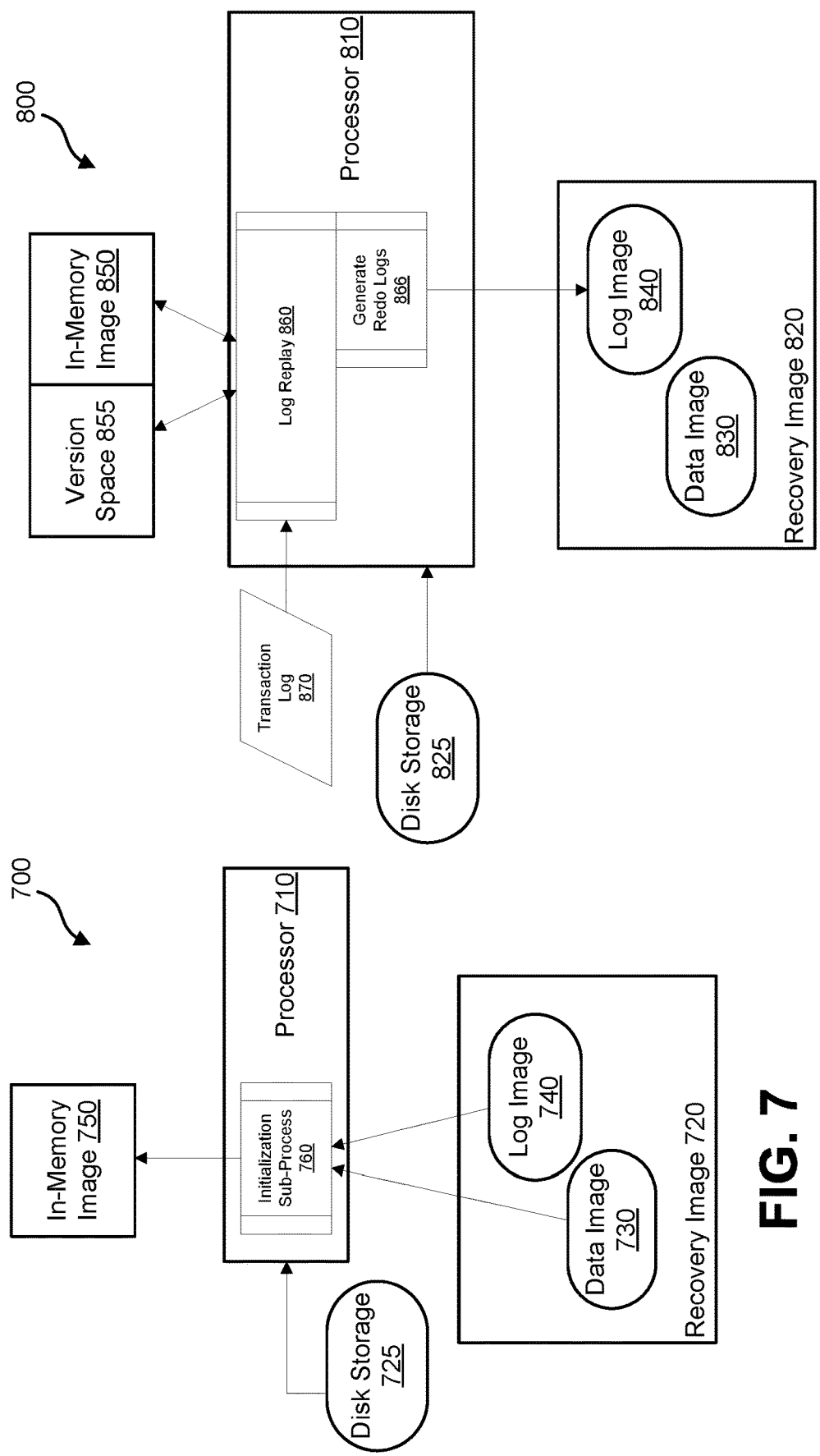

PHYSIO-LOGICAL LOGGING FOR IN-MEMORY ROW-ORIENTED DATABASE SYSTEM

TECHNICAL FIELD

The subject matter described herein relates to database systems and more particularly to database systems employing a primary database and a secondary, hot-standby, database.

BACKGROUND

A database system includes a database and a database management system (DBMS). A database is an organized collection of data. A DBMS comprises computer software that executes on one or more processors and interacts with users, other applications, and a database to capture and analyze data. A DBMS may allow for the definition, creation, querying, update, and administration of databases.

Database systems rely on data replication and synchronization to maintain continuous system availability. Typically, in such a system, a complete copy of the database is stored at a first datacenter and the same complete copy of the database is stored at a second datacenter. The first and second datacenters may be in different locations or they may be in the same location. Since the data in the second datacenter needs to be the same as the data in the first datacenter, a synchronization mechanism is typically employed to handle synchronization of the data. If there is a failure associated with the first datacenter, the system can switch to using the database at the second datacenter without significant issues.

Since the second datacenter may be asked to perform all of the same tasks as the first datacenter, typically, the second datacenter has the same hardware and software requirements as the first datacenter. Sometimes more than two datacenters may be included within a database. In addition, many database systems function as in-memory computing platforms that perform complex analytics on the data stored or exchanged with its client applications. Synchronization and recovery of these database systems involve logging, i.e., communicating changes in data and metadata between the datacenters through log files.

In database systems, metadata is generally used to describe various forms of data that are handled by the database systems. Metadata typically refers to data that provides information about other data. In the case of database systems, metadata includes information about database objects used by its client applications or its internal calculation engine that performs complex analytics on the database objects. Metadata can be broadly characterized as structural metadata, descriptive metadata, and administrative data.

Thus, there is a need for systems and methods that simplify implementing solutions for database systems and their client applications that deal with efficient logging of various types of metadata and database objects.

SUMMARY

In one aspect, provided herein are methods for restoring a database image of a secondary database system. Related apparatus, systems, techniques and articles are also described. In some embodiments, at the secondary database system, a database image of a database system is initialized based on a recovery image that comprises metadata logs and non-metadata logs. At least one of the metadata logs comprises a metadata undo log for a metadata object of the database system that has non-committed data included in the database image. The system applies the at least one metadata undo log to the initialized database image and generates at least one metadata redo log based on the applied at least one metadata undo log. A first pagelist and first indexes of the database system are rebuilt based on first data segments of the database image, which include data of the corresponding metadata objects, and the corresponding metadata objects of the database system. After rebuilding the first pagelist and the first indexes, the initialized database image is updated by replaying the at least one metadata redo log, the metadata logs, and the non-metadata logs. Then, after updating the initialized database image, a second pagelist and second indexes for the database system are rebuilt based on second data segments of the database image, which includes data of the corresponding non-metadata objects, and the corresponding non-metadata objects of the database system. In these embodiments, each of the first data segments is statically separated from the second data segments in physical memory space.

In some embodiments, the recovery image includes a savepoint image. In other embodiments, the metadata logs are logical logs and the non-metadata logs are physical logs. In yet other embodiments, the first data segments consist of data of metadata objects and the second data segments consist of data of non-metadata objects. In some embodiments, the non-metadata objects include user data objects.

In some embodiments, rebuilding of a first pagelist and first indexes occurs after applying the at least one least one metadata undo log to the initialized database image. In some embodiments, the first data segments comprise one or more first pages loaded from a data image of the secondary system, and the second data segments comprise one or more second pages loaded from the data volume. In some embodiments, the applying the at least one undo metadata logs is independent of the replaying of the metadata logs and non-metadata logs.

In some embodiments, in response to determining that at least one of the non-metadata logs is a metadata undo log for a non-metadata object of the database system that has non-committed data included in the database image the at least one non-metadata undo log is applied to the initialized database image. In other embodiments, the at least one metadata undo log and the at least one non-metadata undo log are applied before the rebuilding a first pagelist and first indexes of the database system. In some embodiments, the database image is a row store.

In another aspect, a non-transitory computer-readable storage medium is provided herein that includes instructions to perform any of the methods disclosed herein.

In yet another aspect, a computer-implemented database recovery system is provided herein that comprises one or more data processors and a computer-readable storage medium encoded with instructions for commanding the one or more data processors to perform any of the methods disclosed herein.

The subject matter described herein for using physio-logical or mixed logging of metadata and non-metadata, i.e., information or data that is not metadata, provides many technical advantages. As an example, the subject matter described herein may provide increased average throughput for a database system during high workloads to reduce the likelihood that a request to the database system for data may be queued, buffered or rejected until sufficient system resources are available to complete the request, by enabling load balancing between a primary database system and a backup database system. A backup database system should restart, when necessary, as quickly as possible and resume backup operations to ensure the high availability of the data contained in the primary and backup database systems and to provide disaster recovery in the case the primary database suffers a disaster. To enable efficient operational load balancing a backup database should be maintained in a consistent state, even at the moment the backup database of the backup database system initialization completes, for example after a restart. To enable a consistent state in a backup database system at the moment initialization completes, and provide flexible and efficient logging between the primary and backup system a mixed logging method is used. This mixed logging method allows for more efficient of larger data amount in case of metadata by using logical logging, while handling, e.g., user data, through physical logs.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 7 is a diagram illustrating one or more features of initializing a database, according to some embodiments.

FIG. 8 is a diagram illustrating one or more features of log replay for transaction replication, according to some embodiments.

Like reference symbols in the various drawings indicate like elements.

DETAILED DESCRIPTION

Figure 1:
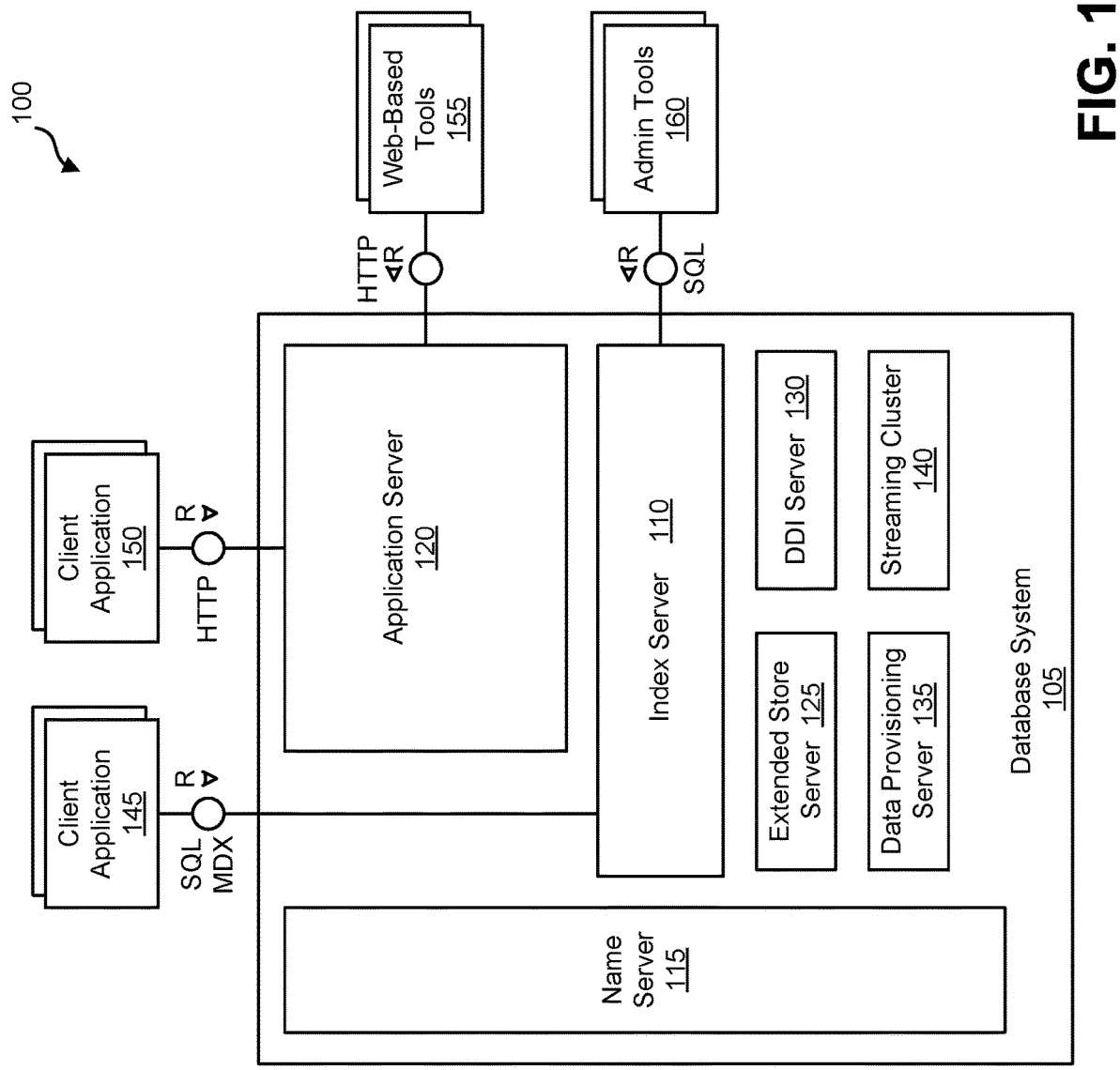
FIG. 1 is a system diagram illustrating an example database system for use in connection with a metadata catalog, according to some embodiments.

The subject matter described herein discloses apparatus, systems, methods, techniques and articles for using physiological or mixed logging of metadata and non-metadata that may provide increased average throughput capabilities for a database system during high workloads to reduce the likelihood that a request to the database system for data may be queued, buffered or rejected until sufficient system resources are available to complete the request. In some examples, apparatus, systems, methods, techniques and articles disclosed herein utilize secondary, backup database systems to execute queries to reduce the workload of a primary database system.

A database or database system may be represented as a table or a set of tables, the tables containing data in rows and/or columns. In a row based database, data in a table may be stored and organized by rows. Alternatively, data in a table may also be stored and organized by columns and such a database is called a column oriented database or a columnar database. Column oriented databases typically make more efficient use of storage by replacing redundant data with a pointer. One example of a database system is SAP HANA®. SAP HANA® is a column oriented relational database system. SAP HANA® is also an in-memory database (IMDB) in which the data associated with the database is stored in main memory instead of disk storage so it may be accessed more quickly. IMDB systems are generally column oriented databases since column oriented databases make more efficient use of the expensive main memory Some databases may utilize replication to improve reliability and availability of the database. If data replication is implemented, the database system may include a first datacenter and a second datacenter. The first datacenter may include a processor and memory sufficient to store the data associated with the database. The first datacenter may store a first (primary) copy of the data associated with the database. The second datacenter may also include a processor and memory sufficient to store the data associated with the database. The second datacenter may store a second (backup) copy of the data associated with the database. In some implementations, the database may include more than two datacenters (e.g., three or four datacenters)

To better utilize the second (and subsequent) datacenter, some database systems, such as SAP HANA®, may simultaneously utilize the first datacenter and the second datacenter. In this mode of operation, the first datacenter may be configured to delegate queries to the second datacenter to balance the load between the two systems. Such a situation may be referred to as Active/Active (AA) operation since the first datacenter and the second datacenter both actively respond to queries at the same time.

For many of their client applications, database systems may be required to support operations on a 24/7 schedule, and database systems may be required to provide a guaranteed maximum amount of downtime, during which a database system is not able to fully support ongoing operations. When a system is required to ensure an agreed level of operational performance, it may be referred to as a high availability system ("HA").

Hot-standby systems are typically used to guarantee substantially continuous uptime with no, or very little, downtime. A hot-standby system, or a backup system, is a database system that may be activated quickly in the event of a disruption causing one or more functions of a primary operational database system to fail. Such a disruption may be referred to as a disaster, and the process of restoring a database system to full operations may be referred to as disaster-recovery ("DR").

When a secondary, or backup, database system serves the purpose of HA/DR functionality, an apparatus, system, technique or article that utilizes a secondary, backup database system to increase throughput of a workload on a primary database system should not interfere with the HA/DR functionality of the backup system. The use of the backup database system to increase throughput must also maintain the backup database in substantially the same state as the primary database. In the event of backup system restart, the backup database should restart and resume load balancing support by enabling consistent read transactions in as little time as possible. Therefore, a recovery image, referred to as a snapshot image, containing all transaction data, metadata, user data and other application data, is captured on a periodic basis regardless of whether it is committed or uncommitted. On recovery this image is loaded into an in-memory component of the database, and read access is enabled. To enable immediate read access restore the database should be able to provide consistent transaction results, therefore it is necessary to remove any uncommitted changes, and restore those uncommitted changes to an invisible state from the perspective of read transactions.

Load balancing and HA systems further contribute to the increase in metadata and the corresponding number of database objects, since data needs to be efficiently communicated between the various systems. Logging is typically used to communicate metadata or data between a primary database system and the various additional systems or for restoring a database system recovering from a disaster. Logging refers to creating and maintaining a log that lists any changes to the state of a database system. For example, logging can be used to prevent loss of persistent data in a database system As noted above, metadata can be broadly characterized as structural metadata, descriptive metadata, and administrative data. Structural metadata refers to information that describes the structure of database objects included in database systems, while descriptive metadata includes information about database object that is used in searching a database system to identify, for example, the location of the underlying database object. On the other hand, administrative metadata includes information about database object that facilitates administrative tasks of handling the underlying database object. For example, a database system can use administrative metadata to organize database objects and identify relationship among the database objects managed by the database system.

Often, the responsibility of managing the metadata and the database objects described by the metadata is placed on the developers of the database system and its client applications. As the number of metadata and the corresponding number of database objects grows, developers are increasingly burdened by the overhead of implementing solutions that can handle this increase and the complexity that accompanies it without sacrificing the usability of their implementations. In some embodiments, logical logging is therefore used for metadata, while physical logging is used non-metadata that includes, for example, user data.

Database Systems

FIG. 1 is a diagram 100 illustrating a database system 105 that can be used to implement aspects of the current subject matter, according to some embodiments. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also be used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
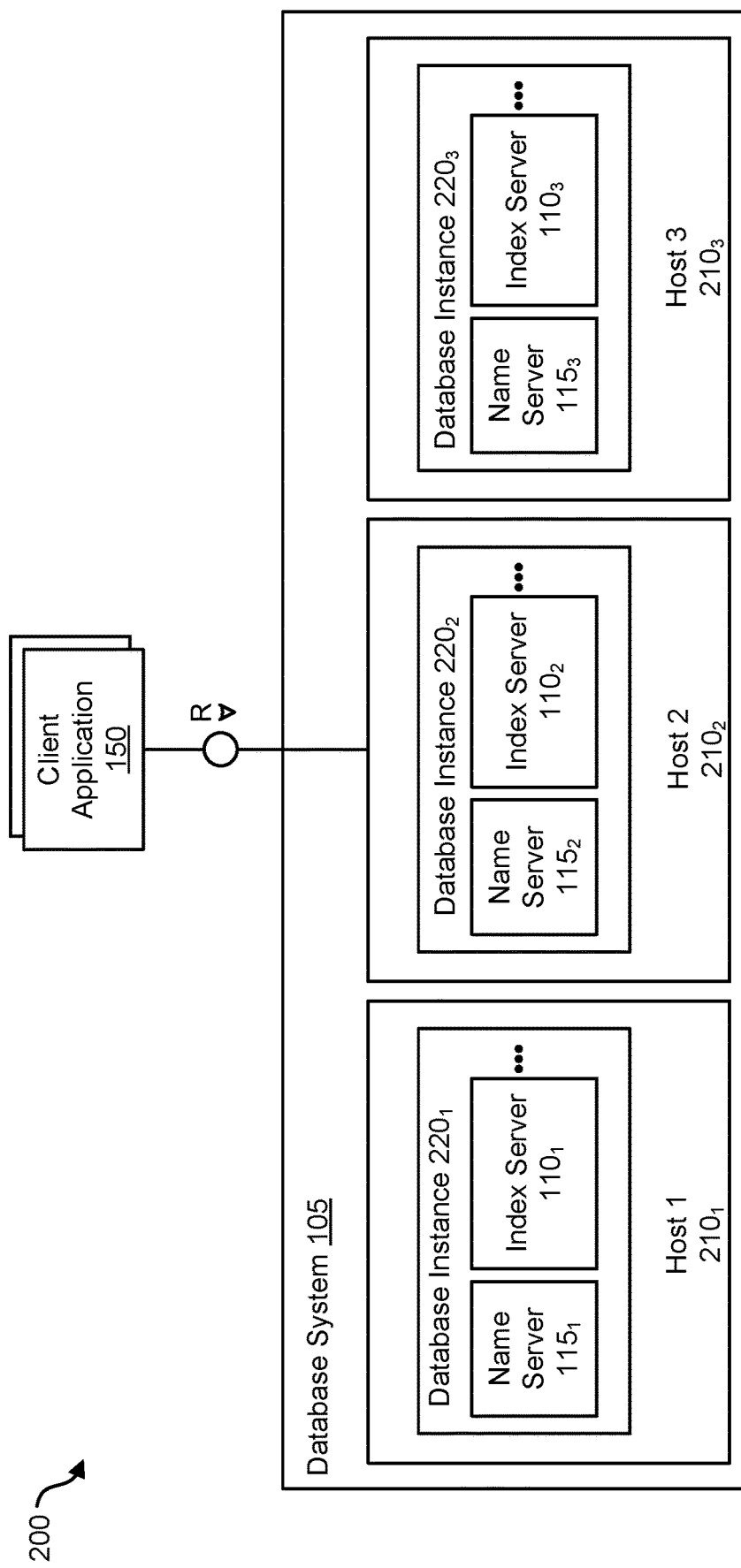
FIG. 2 is a system diagram illustrating a distributed database system having a plurality of database instances for use in connection with a metadata catalog, according to some embodiments.

FIG. 2 is a diagram 200 illustrating a variation of the database system 105 that can support distribution of server components across multiple hosts for scalability and/or availability purposes, according to some embodiments. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Index Server

Figure 3:
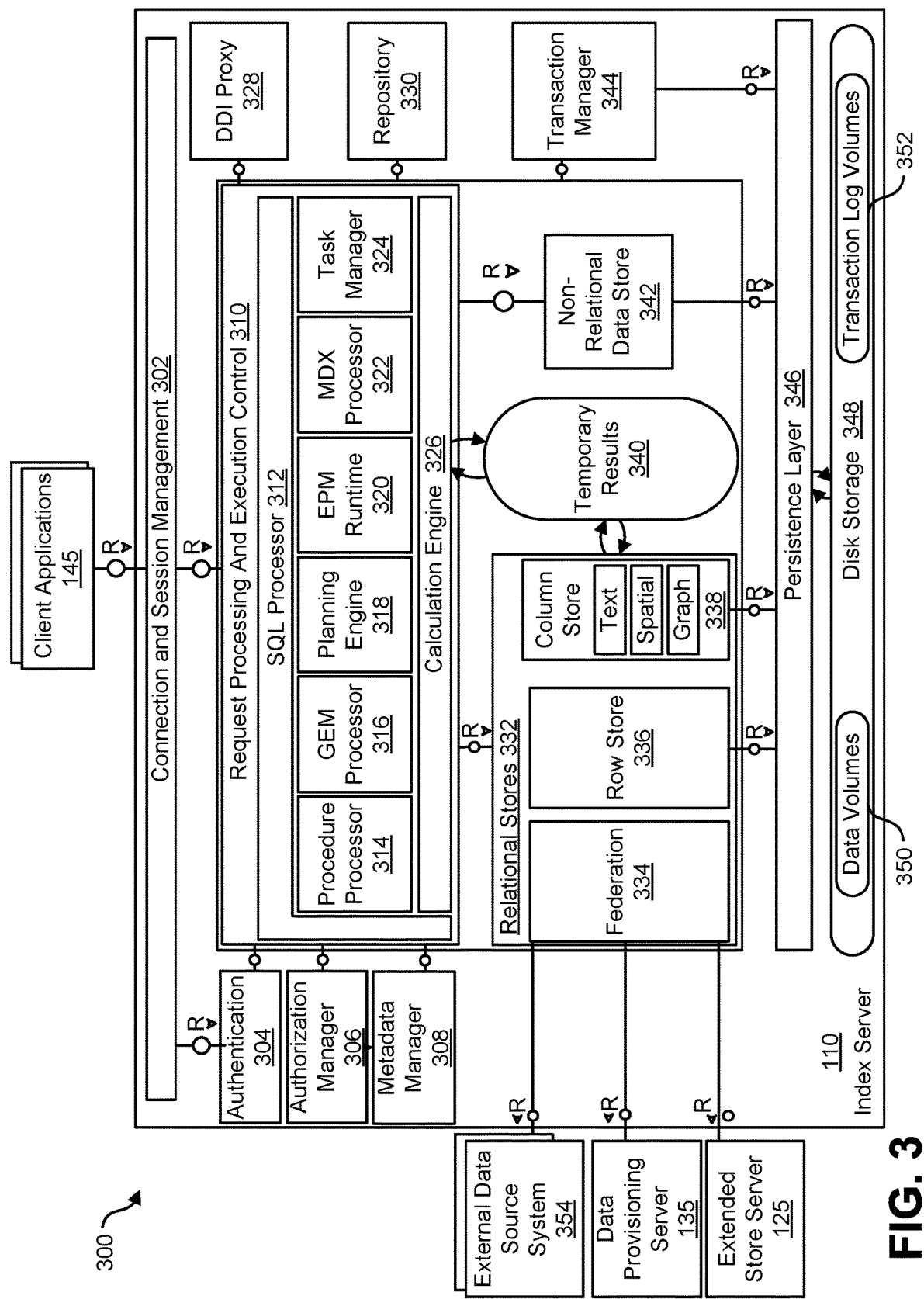
FIG. 3 is a system diagram of an index server forming part of the database system of FIG. 1, according to some embodiments.

FIG. 3 is a diagram 300 illustrating an architecture for the index server 110 (which can, as indicated above, be one of many instances) forming part of the database system of FIG. 1, according to some embodiments. A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 145 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system (s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persistent objects can be loaded via their persistent object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persistent data and it can also contain a logger component that manages a transaction log. Transaction log entries can be written explicitly by using a log interface or implicitly when using the virtual file abstraction.

The persistence layer 236 stores data in persistent disk storage 348 which, in turn, can include data volumes 350 and/or transaction log volumes 352 that can be organized in pages. Different page sizes can be supported, for example, between 4 k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Database Replication Systems

Figure 4:
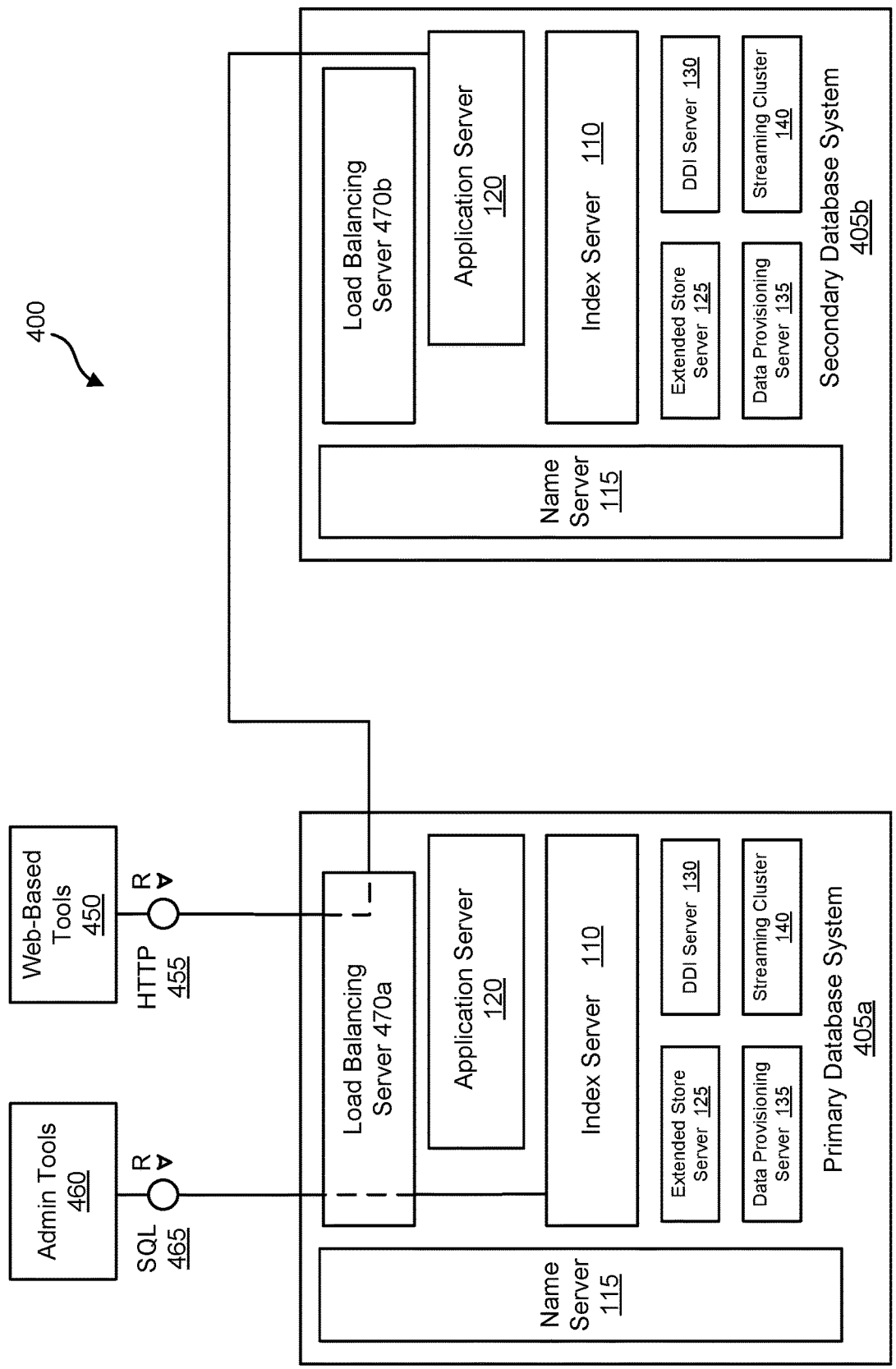
FIG. 4 is a system diagram illustrating an architecture for use in connection with a metadata catalog, which includes a primary database system and a secondary database system that serves as hot-standby to primary database system, according to some embodiments.

FIG. 4 is a system diagram illustrating an architecture 400 to support load balancing between a primary database system, or primary system 405a and a secondary database system, or secondary system 405b, which serves as hot-standby to primary system 405a, according to some embodiments. Each of the primary system 405a and the secondary system 405*b* may be a single instance system, similar to database system 105 depicted in FIG. 1, or each may be a distributed variation of database system 105 as depicted in FIG. 2. Such an architecture 400 may be useful in a high availability data system, or in a disaster recovery system, or in a combination HA/DR system.

Each of the primary system 405*a* and secondary system 405*b* may include a load balancing functionality. Such load balancing functionality may for example be contained within a distinct load balancing server 470*a* or 470*b*. But, such load balancing functionality may be managed by any suitable processing system. For example, the application server 120 of the primary system may also manage the load balancing of requests issued to the application server of the primary system 405*a*, sending requests to the secondary system 405*b* as necessary to maintain a well distributed workload.

As depicted in FIG. 4, each of the primary system 405*a* and the secondary system 405*b* includes a load balancing server 470*a* and 470*b* which respectively receive requests from user applications directed to the primary system 405*a* or the secondary system 405*b*. Such request may come from either admin tools 460 or web-based tools 450, or any other user application. Upon receiving a request a load balancing server, e.g. 470*a*, determines how to distribute the workload. As depicted load balancing server 470*a* routes an SQL request 465 from admin tools 460 to the index server 110 of the primary system 405*a*, while routing an HTTP request 455 from web-based tools 450 to the application server 120 of the secondary system 405*b*.

Load balancing of resources between a primary system 405*a* and a secondary system 405*b* can give rise to a number of complicating issues. For example, if either of the requests 455, 465 requires writing to one or more data tables, or modifying a data table, then the two systems 405*a*, 405*b* will diverge. After many instances of write requests being distributed between the primary system 405*a* and the secondary system 405*b*, the two systems would be substantially different, and likely unusable. In another example, an application request, e.g. 465, may perform a write transaction that is followed by a read transaction, e.g. 455, related to the data written by the write request 465. If the write request is allocated to the primary system 405*a*, the read request would obtain a different result depending on whether the subsequent read transaction is carried out by the primary system 405*a* or by the secondary system 405*b*.

Load balancing in a HA/DR system, by distributing a portion of the workload of a primary data system to a hot-standby or backup system must be done in a way that does not disturb the principal purpose of the backup system, which is to substantially eliminate downtime in a high availability system by enabling quick and efficient recovery of operations. In other words, as a rule load balancing cannot break the hot-standby. Given this principal purpose, any solution that enables load balancing of workload between a primary system and a backup system must maintain the backup system in an identical, or nearly identical, state as the primary system. Such a solution should also avoid or prohibit any actions which may cause the state of the backup system to substantially diverge from the state of the primary system. In this way, in the event of a partial or total failure of the primary system due to disaster, the backup system can failover to a primary system mode with minimal or no impact to client applications.

Figure 5:
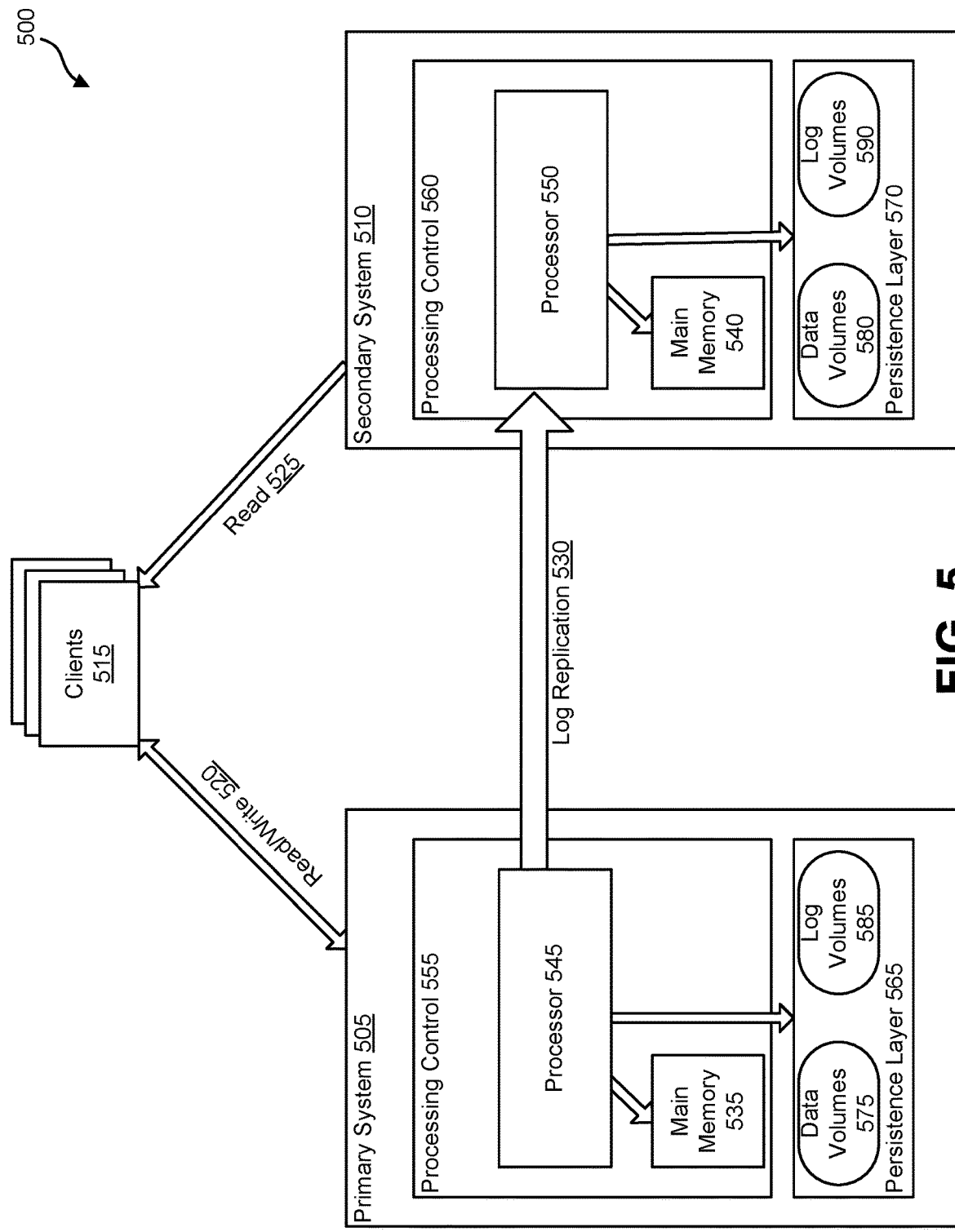
FIG. 5 is a system diagram illustrating a high-availability/disaster-recovery (HA/DR) database systems for use in connection with a metadata catalog, according to some embodiments.

FIG. 5 illustrates a HA/DR system 500 for use in connection with a metadata catalog, according to some embodiments. HA/DR system 500 includes a primary system 505 and a secondary system 510 and is capable of load balancing between primary system 505 and secondary system 510 without interfering with the hot-standby functionality of the secondary system 510. Each of primary system 505 and secondary system 510 may be single instance database systems similar to database system 105 depicted in FIG. 1, or a distributed variation of database system 105 as depicted in FIG. 2. Furthermore, each of primary system 505 and secondary system 510 may comprise less, more or all the functionality ascribed to index server 110, 300, name server 115, application server 120, extended store server 125, DDI server 130, data provisioning server 135, and stream cluster 140. But, for simplicity of illustration HA/DR system 500 has been simplified to highlight certain functionality by merely distinguishing between processing control 555, 560 and a persistence layer 565, 570 of each respective system 505, 510.

A collection of clients may each maintain an open connection to both the primary system 505 and the secondary system 525. For example, client 515 maintains a read/write connection 520 to the primary system 505 and a read only connection 525 to the secondary system 510. Alternatively, client 515 may maintain a read/write connection with each of the primary system 505 and the secondary system 510, while processes within the secondary system 510 itself prohibit execution of any requests that require a write transaction upon the secondary system while it is in backup mode. Management of load balancing of the workload required by a client application executing at client 515 may be managed by the client 515 application itself. Alternatively, a client 515 application may submit a query request to the primary system 505. A process control 555 load balancing process executing on processor 545 then may determine where the query should be executed and replies to the client 515 with instructions identifying which system the client 515 should issue the query to.

Primary system 505 may include an in-memory database in which substantially all actively used data may be kept and maintained in main memory 535 so that operations can be executed without disk I/O, which requires accessing disk storage.

Active operations of applications within processing control 555 may cause processor 545 to read and write data into main memory 535 or to disk in the persistence layer 565. Processing control 505 applications also cause processor 545 to generate transaction logs for capturing data transactions upon the database, which processor 545 then persists in the log volumes 585. As substantially all actively used data may reside in-memory, processing control 555 may interact primarily with data held in main memory while only resorting to data volumes 575 for retrieving and writing less often used data. Additional processes within processing control 555 may be executed by processor 545 to ensure that in-memory data is persisted in persistence layer 565, so that the data is available upon restart or recovery.

Primary system 505 may be the primary operational system for providing the various functionality necessary to support 24/7 operations for an organization. The time it takes after a disaster to restore full, or minimum, functionality of a data system, for example by bringing a hot-standby online, is referred to as recovery time. Secondary system 510 may be a hot-standby, ready to come online with minimal recovery time so as to minimize downtime. In an effort to minimize recovery time, and thereby downtime, in some embodiments, the secondary system in a state just short of fully operational. Secondary system 510 may be an identical physical system as primary system 505, and may be configured in a substantially identical manner in order to enable the secondary system 510 to provide all the same functionality as primary system 505. For example, processing control 560 may include all the same applications and functionality as processing control 555, and persistence layer 570 may include data volumes 580 and log volumes 590 that are configured in an identical manner as data volumes 575 and log volumes 585 respectively. Secondary system 510 may also include an in-memory database kept and maintained primarily in main memory 540.

Primary system 505 and secondary system 510 differ in that all requests, from client 515 or otherwise, that require a write transaction are executed only in primary system 505. Primary system 505 and secondary system 510 further differ in that all write transactions are prohibited by the secondary system 510. In order to propagate changes to the data or the underlying schema from the primary system 505 to the secondary system 510, processor 545 also replicates 530 transaction logs directly to the process control 560 of the secondary system 510. Process control 560 includes one or more applications that cause processor 550 to then replay the transaction logs replicated from the primary system 505, thereby replaying the transactions at the secondary system 510. As transaction logs are replayed, the various transactions executed at the primary system become reflected in the secondary system 510. In order to ensure both the HA functionality and the load balancing functionality, replay of the transaction logs at the secondary system places data in main memory 540, and also persists any data committed in the primary system to persistence layer 570 to be stored by data volumes 580. Replay of the transaction logs at the secondary system 510 may also results in the transaction logs being persisted in log volumes 590.

Transaction logs may be replicated in different ways. Where maintaining a standby system in as close to the same state as the primary system is an important factor, logs may be replicated synchronously meaning that the primary system will not commit a transaction until the secondary successfully responds to the log replication. One appreciates that this will slow performance of the primary system. Conversely, where performance of a primary system is a priority, logs may be replicated asynchronously, in which case the primary operation proceeds with committing transactions without waiting for a response. Various tradeoffs can be made between these two scenarios to achieve a proper level of performance while ensuring replication of critical data.

It will be appreciated from the detailed description above that such a secondary system in standby mode, such as secondary system 510, can only be as current as its most recently replayed transaction logs. Transaction logs are replicated and replayed at the secondary system 510 only after a transaction executes in the primary system 505. Secondary system 510, therefore, is always slightly behind an associated primary system 515. Also, there is no guarantee that a query routed to the primary system in a load balancing effort will be executed before, during or after a particular transaction log is replayed. Thus, the state of the primary system 505 and the state of the secondary system will rarely if ever be identical. But, by addressing certain concerns, secondary system 510 may be kept in a state substantially close to the same state as the primary system 505 such that the workload required by many operations can be supported by the secondary 510. These are just a few of the issues to be addressed in order to provide a robust load balancing implementation in a HA/DR architecture, where the hot-standby system also functions to carry a portion of the workload. One or more solutions to issues arising by the load balancing solution depicted in FIG. 5 are now addressed.

System Recovery

In the event of backup system restart, the backup database should restart and resume load balancing support by enabling consistent read transactions in as little time as possible. Therefore, a recovery image, referred to as a snapshot image, containing all transaction data, metadata, user data and other application data, is captured on a periodic basis regardless of whether it is committed or uncommitted. On recovery, this image is loaded into an in-memory component of the database, and read access is enabled. The recovered image may contain transaction update data associated with uncommitted transactions in a state that is visible to queries executed by the database system. To enable immediate read access restore the database should be able to provide consistent transaction results, therefore it is necessary to remove any visible uncommitted changes from the data image loaded from the savepoint, and restore those uncommitted changes to an invisible state from the perspective of read transactions.

In embodiments a database is an in-memory database held main memory 540. A row store maintaining, among other things, information regarding open transactions is also held in main memory 540 in a memory space apart from the in-memory database that contains committed user data. This space apart may be a version space containing update version of records affected by a write transaction upon the in-memory database along with in-memory undo logs. Upon commit of an open transaction, the in-memory database image may be updated with the update records from version space. Upon a system restart the version space in memory is lost or destroyed.

A savepoint image, or recovery image, may be generated that includes all transaction data including committed and uncommitted changes as well as the undo logs associated with the uncommitted data. A savepoint image may be stored in a persistent store, such as data volume 580. After a restart the in-memory image may be rapidly restored by loading the savepoint image in order to resume transaction service as quickly as possible. In embodiments, at the point of initialization the version space managing uncommitted transaction information remains lost. In order to provide consistent returns any updates based on open transactions, restored from the savepoint, should be invisible to queries until they are committed after transactional service is restored. In embodiments the open transactions are rolled back using the undo logs from the savepoint recovery image, at which point consistent transaction service can be restored. So as to preserve the transaction data the transactions are then replicated in the order in which they originally occurred before the save point was captured. In embodiments, the open transactions are replicated by generating redo logs based on the undo logs used to roll back the uncommitted changes. Then, the newly generated redo logs are replayed to replicate the transactions in the proper order and to reconstruct the version space, allowing the transactions to remain invisible until they are committed and become visible to other transactions. In this way a consistent state is maintained after transactional service is restored.

A consistent state is one in which a query on the secondary system will not return partial results from a transaction executed on the primary system. In other words, if part of a transaction is visible to a query made by a write transaction, then all other changes caused by that transaction should be visible to the query—this is referred to as visibility atomicity. A consistent state is also one in which when the results of a transaction are initially visible to a query, the same transaction results will be visible to the query until the query finishes. Likewise, once a query could not read a transaction's results, those results should remain invisible to the query until the query finishes—this is referred to as visibility stability. A consistent state is further one in which results from a second transaction executed upon the primary system after a first transaction will not be visible to a query on the backup database if the first transaction is not also visible, and once a transactions results are visible to a first query, they should remain visible to a later executed query. In other words, if a second transaction is committed after a first transaction is committed, and the second transaction's results are visible to a query, the first transaction's results should also be visible to the query—this is referred to as visibility monotonicity.

Figure 6:
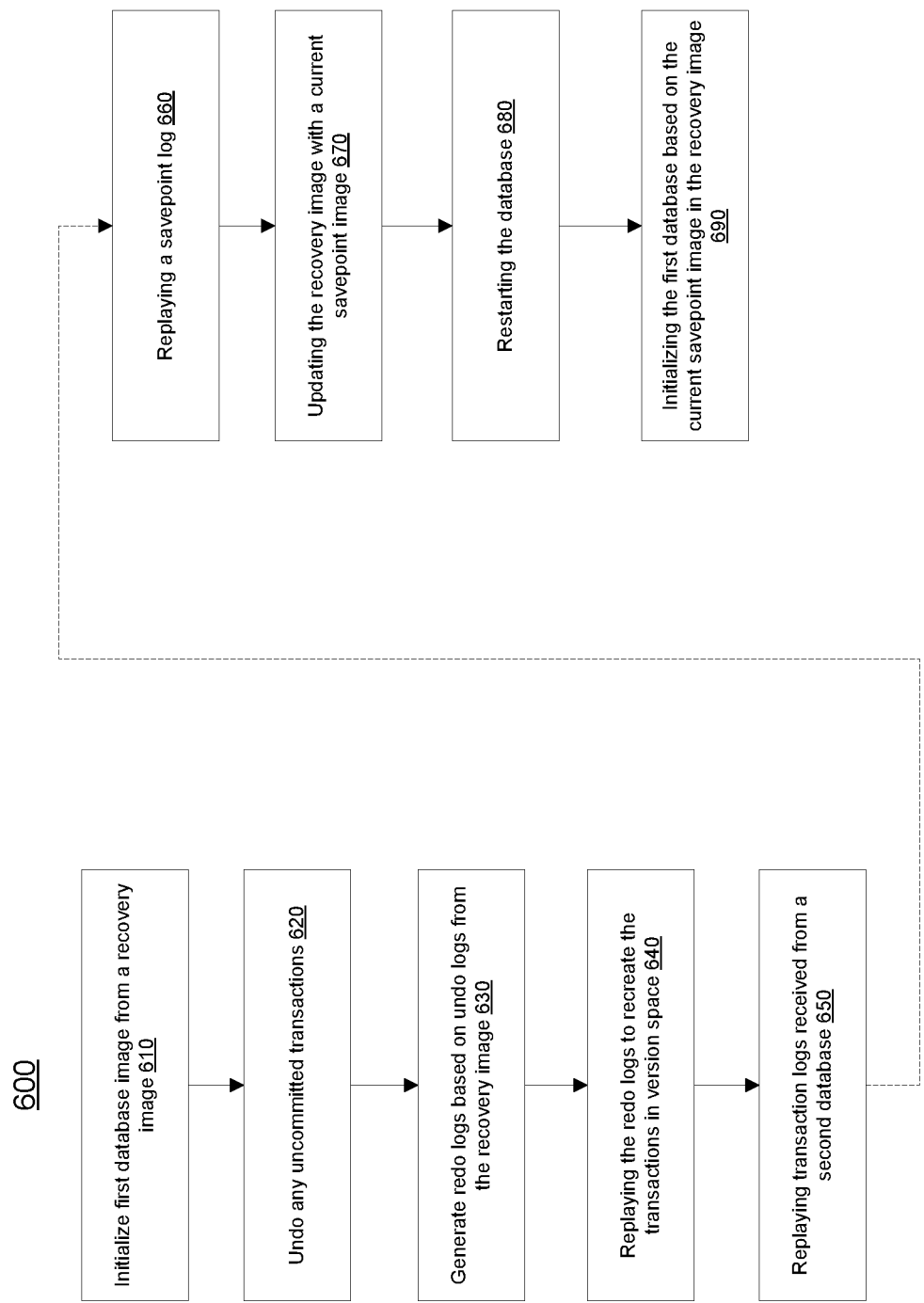
FIG. 6 is a flow chart depicting exemplary operation of a system or method for version space reconstruction during initialization of a secondary database for use in connection with the current subject matter, according to some embodiments.

FIG. 6 is a flow chart depicting exemplary operation of a system or method for version space reconstruction during initialization of a secondary database for use in connection with the current subject matter. The exemplary operations described in FIG. 6 may be carried out by any suitable processor 550. In operation 610, a database image is initialized based on a recovery image. In embodiments, the recovery image is a savepoint image captured during normal operations of the database system and stored in a persistent state such as in a hard disk drive or data volume 580. In operation 620, uncommitted transactions are rolled back. In embodiments, uncommitted transactions are rolled back by undoing the transactions using undo logs associated with the transactions. In operation 630, new redo logs describing the rolled back transactions are generated. In embodiments, the new redo logs are in-memory data structures containing information for generating new update versions from an undo log. In operation 640, the new redo logs are replayed to recreate the rolled back open transactions. In embodiments, this replication updates the in-memory data structures of the database including the version space updates associated with the rolled back transactions. In operation 650, replaying of transactional logs received from a second database resumes. In embodiments, redo logs received after the savepoint was constructed, but before the restart are replayed after reconstruction of the version space completes. Then, replaying transaction logs received from a second database resumes as under normal operating conditions.

Sometime later, a savepoint log file is received from the secondary system as in operation 660. This cause the database system to update the recovery image with the current savepoint image at operation 670. This current savepoint image again includes data from open transactions and associated undo logs. Sometime later the database is again restarted in operation 680 and upon restart the database is again initialized based on the savepoint image 690, at which point the process may proceed as described above in order to again reconstruct the version space.

FIG. 7 is a diagram 700 illustrating one or more features in accordance with one or more embodiments described herein. In particular, FIG. 7 depicts an exemplary flow of data during initialization of an image of a database held in memory, for example in-memory image 750. The flow of data depicted in FIG. 7 may, be employed during process 610. In particular, one or more processors 710 execute one or more sub-processes such as initialization sub-process 760. Initialization sub-process 760 is retrieved from a persistent storage by processor 710 from a hard disk, or from disk storage 725. Initialization sub-process 760 can be retrieved during a system restart. Such a system restart may be used in the case of planned maintenance or after a disaster occurring at the secondary/backup system such as secondary system 510, which may employ initialization sub-process 760.

The initialization sub-process begins initializing the in-memory image 750 of an in-memory database. In embodiments, this initialization is based on one or more data images residing in data volume 730. Data volume 730 is stored in a persistent data volume as part of a persistence layer or recovery image 720 of a database system such as data volume 580 in persistence layer 570 of secondary system 510. Data volume 730 may include at least the most recent data captured from or stored by a database system's in-memory database during runtime.

In embodiments, a savepoint is generated 670 and stored in a persistent form during database runtime in the normal course of operations. Data stored in a persistent form, or simply persisted, is stored in a form that can survive a system crash, disaster or system restart. A savepoint may be created on a regular basis, for example every five minutes, during normal runtime operations. Alternatively, generation of a savepoint may be initiated by the replay of a savepoint log, by a backup system performing transaction log replay, for example during process 660.

As a system crash, or restart due to planned maintenance, may occur while one or more transactions remain open and sometime after a savepoint image is captured. In embodiments, that initialization sub-process 760 relies on one or more logs stored in a log volume recovery image 720. That is, based on the persisted data, and persisted transaction logs contained in a recovery image, the in-memory image 750 at the time of a crash is recovered by initialization sub-process 760 executing on processor 710. It will also be appreciated that recovery image 720 may alternatively be separate data images and log images, and may be stored in disparate locations or may be stored locally to processor 710.

FIG. 8 is a diagram 800 illustrating one or more features in accordance with the one or more embodiments described herein. In particular, FIG. 8 depicts an exemplary flow of data during operations of a backup system implementing a transaction log replay scheme for transaction replication between a primary system, e.g. 505, and a backup system, e.g. 510 during operation 650. In embodiments, one or more processors in a backup database system 810 may receive one or more processes from persistent disk storage 825. These one or more processes may be a log replay process 860 that further interacts with one or more additional processes, for example replay savepoint log sub-process 865 and generate redo logs sub-process 866. As will be appreciated, these sub-processes may be a single sub-process or may include one or more additional sub-processes to effectuate a log replay scheme.

In embodiments, during normal operations, when the primary system is operating under normal conditions, and a backup system is providing HA/DR functionality of a primary system by replay of transaction logs 650. The primary system will execute various transactions in the primary database and accordingly generate transaction logs, such as transaction log 870. A transaction log, such as transaction log 870, may comprise one or more log entries comprising one or more redo log entries, commit log entries, pre-commit log entries, and/or savepoint log entries. Alternatively, a transaction log may be any one of distinct redo logs, commit logs, pre-commit logs, and/or savepoint logs. During operations, the primary system, for example 505, 405a, will periodically generate a savepoint.

In embodiments, a savepoint is created by capturing the in-memory image of the database in a persistent form, such that it will be available upon recovery from a restart or a system crash. A savepoint may, for example, be an on-disk representation, or image, of the in-memory image of the database. In embodiments, an IMDB maintains a large portion of the most actively accessed data in memory, most modifications to the IMDB, such as by update or insert statements, or the creation of tables, are often first carried out and committed to memory. These changes may not be reflected in a persistent, non-transient, store at the time of execution and at commit time. Instead, such modifications are persisted, or persistently stored, first through the generation and storage of transaction logs, for example in log volume 590 or 840, and second by the periodic storage of the in-memory image of the database by generation of a savepoint in data volume 580 or 830. Together these volumes 580, 590 or 830, 840 may be considered a recovery image 820.

In embodiments of a secondary or backup system, savepoints and transaction logs are generated by the replay of transaction logs received from the primary system. Processor 810 executes instructions comprising log replay sub-process 860 may receive a transaction log 870, which may include one or more redo log entries, and one or more commit log entries, and at least one savepoint log entry, each generated by the primary database system. When the processor 810 replays, by log replay sub-process 860, a redo log entry or a commit log entry of the transaction log 870, one or more modifications may be made to one or more records in the in-memory image 850 of the secondary system. In embodiments a row-store version space is also updated to include record of the open transactions. In embodiments an in-memory index may also be maintained and updated to reflect new transactions. This in-memory index may also be in a memory space apart from the IMDB. In embodiments it is a part of the version space, and in other embodiments it is apart from both the IMDB and the version space.

In certain examples, these modifications to the in-memory image 850 also trigger the processor 810 to execute generate redo logs sub-process 866. Generate redo logs sub-process 866 generates new transaction logs and then modifies the recovery image 820, for example by storing the new transactions logs in log volume 840. When the processor 810 replays, a savepoint log entry, this may for example initiate execution of another sub-process, replay savepoint log sub-process 865. Replay savepoint log sub-process 865 may cause the in-memory image 850 to be captured in an on-disk image, for example data image 830. In this way, replay savepoint log sub-process 865 modifies the recovery image 820.

Mixed Logging

Figure 9:
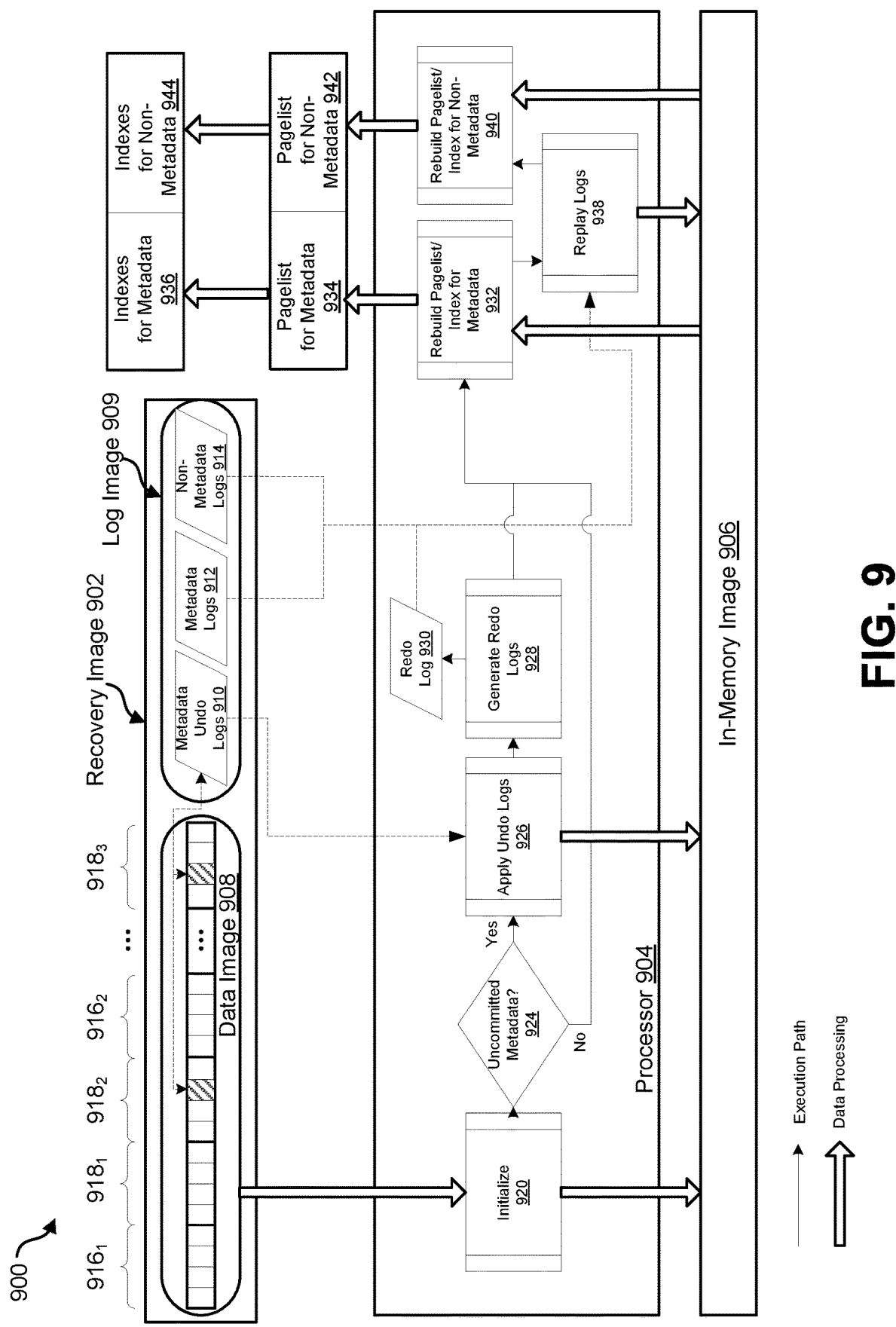
FIG. 9 is a diagram that illustrates restoring a database image of a secondary database system when using mixed logging, according to some embodiments.

FIG. 9 is a diagram that illustrates restoring a database image of a secondary database system 900 when using mixed logging, according to some embodiments. The secondary system 900 may be single instance database systems similar to database system 105 depicted in FIG. 1, or a distributed variation of database system 105 as depicted in FIG. 2. In some embodiments, the database image includes a row store. Furthermore, the secondary system 900 may comprise less, more, or all the functionality ascribed to index server 110, 300, name server 115, application server 120, extended store server 125, DDI server 130, data provisioning server 135, and stream cluster 140.

It should be appreciated that the secondary system 900, as illustrated in FIG. 9, is only one example of a secondary system, and that the secondary system 900 optionally has more or fewer servers or components than shown, optionally combines two or more servers or components, or optionally has a different configuration or arrangement of the servers or components. The various servers or components shown in FIG. 9 are implemented in hardware, software, or a combination of both hardware and software, including one or more signal processing and/or application specific integrated circuits. Additional details regarding an example implementation of the secondary system 900 or HA/DR server are described and illustrated in connection with FIG. 5 and with architecture 400 in FIG. 4.

The secondary system 900 can include a plurality of components including, for example, a recovery image 902 that is persisted, can be stored in the data volume 350 of the disk storage 348, and accessed in a data volume through the persistence layer 346 by a processor 904. The secondary system 900 can also includes an in-memory image 906 storing a database image after loading and storing the recovery image 902 by the processor 904 in memory. In some embodiments, the recovery image 902 includes a consistent and current savepoint image created by the secondary system 900 in response to receiving a savepoint log from the primary system as described in more detail in connection with FIG. 6. The savepoint image may be stored in a persistent store, such as data volume 580.

The recovery image 902 can include a data image 908 that represents the concurrent and consistent state of the database prior to restart or recovery of the secondary system, and a log image 909 that can include metadata undo logs 910, metadata logs 912, and non-metadata logs 914. Consistent refers to the condition that the states of the primary and secondary system are close (if not identical), and all transaction, data, and metadata is committed to a persistent state in addition to the characteristics described above. Concurrent refers to the latest state of the primary systems or the latest persisted state stored with the secondary system. Non-metadata refers to information and data that is not metadata, for example, user data, application data, client data, or similar information or data not represented by any metadata object of the secondary system 900.

In some embodiment, the data image 908 is divided into non-overlapping data segments 916$_{1-2}$ including non-metadata and data segments 918$_{1-3}$ including metadata of the concurrent and consistent state prior to restart or recovery. The non-overlapping data segments 916 consist of non-metadata, but do not include any metadata. The non-overlapping data segments 918 consist of metadata, but do not include any non-metadata. The data image 908 includes one, two, three, four or more segments or zero segments of a particular type. In some embodiments, one or more data segments 916 are adjacent and/or continuous to data segments 918 in the storage or memory, in other embodiments, the segments area are not adjacent and/or continuous to each other. In some embodiments, the data segments 916, 918 include one or more pages as described in connection with FIG. 3. The data segments 916, 918 can include 4096 pages, and each segment has a size of 64 MB. The data segments 916, 918 can be associated with one or more metadata undo logs 910, one or more metadata logs 912, and/or one or more non-metadata logs 914. In some embodiments, the data segments 916 are only associated with one or more non-metadata logs, while the data segments 918 are only associated with one or more metadata undo logs and/or one or more metadata logs so that the logs are independent of each other when applied to the various data segments. The non-metadata logs 914 can include non-metadata undo logs.

The log types of metadata logs can be a logical log, physical log, or any similar log type. In some embodiments, the metadata logs are logical logs. The metadata undo logs 910 and metadata logs 912 can be logical logs. In some embodiments, the non-metadata logs are physical logs. In some embodiments, the logs are physio-logical or mixed logs with the metadata undo logs 910 and metadata logs 912 being logical logs and the non-metadata logs being physical logs.

In some embodiments, one or more of the data segments 918$_2$, 918$_3$ include one or more pages of metadata that has not been committed, as illustrated in FIG. 9 by the shaded boxes. Each of these pages of non-committed metadata is associated with a metadata undo log 910 in the log image 909, as illustrated by the dashed lines in FIG. 9. Applying the associated metadata undo log rolls back the metadata object of the non-committed (or uncommitted) metadata to a committed state.

Upon restart or recovery of the secondary system 900, the processor 904 can load the recovery image 902, including the data image 908 and log image 909 and initializes 920 the image of the database in the in-memory image 906. Upon initializing 920 the database image, the processor 904 determines (identifies) 924 whether the data image 908 includes any non-committed metadata, i.e., in some embodiments, whether any data segments 918 include any pages of non-committed metadata. If the data image 908 includes any non-committed metadata, the processor applies 926 the metadata undo logs 910 associated with the non-committed metadata to the initialized database image in the in-memory image 906 to roll back the non-committed metadata to a consistent and current state. In case of any non-committed metadata, the processor 904 then generates 928 metadata redo logs 930 based on the applied metadata undo logs that upon replay roll forward the committed and consistent state of the corresponding metadata to the previous non-committed state.

Similarly, in some embodiments, non-metadata undo logs are applied and the corresponding non-metadata redo logs are generated. Applying the undo logs guarantees that the database image is in a consistent and concurrent state without any open transactions and non-committed data, and therefore guarantees consistency of the pagelist and database indexes, also referred to as indexes, that are rebuilt from the database image. To further guarantee consistency of the rebuilt pagelist, indexes, and database image, the undo logs are bundled into self-contained, single logical logs, while the physical logs are processed as is. In case of metadata physical logs, these logs are applied before rebuilding the pagelist and indexes.

In some embodiments, the database image includes row store pages. Each row store page has a unique container id to identify the container that it belongs to. A container in this context refers to a row store table that is persistently stored in disk storage. At startup time of the database system, the row store pages are scanned to link the pages having the same container id together. This guarantees that pages pointing to the same container are consistently managed by the database system. Depending on their state (full, sparse, empty), pages are entered into a system-wide pagelist to ensure reuse of the corresponding space in a page when a new record is inserted in the page. This process of linking row store pages to their containers and entering pages into a pagelist is typically referred to as rebuilding of the pagelist. In some embodiments, the row store indexes are not persistently stored in disk storage. On startup, each row store index is therefore, rebuilt and loaded into memory.

Self-contained, single logical undo logs refer to undo logs that are independent from the application of any other undo log (logical or physical) as to introducing changes to the database image. In some embodiments, physical undo logs for non-metadata and logical undo logs for metadata can be mixed within the data boundaries of a single transaction. For logical metadata logs, pagelist of metadata and indexes of metadata may be required for replaying the logical metadata logs as applied to the consistent database image. On the other hand, in the case of replaying physical logs the pagelist and database indexes are rebuilt after replaying of these logs to ensure consistency of the database image.

Thus, in some embodiments, the processor 904 rebuilds 932 the pagelist 934 of the metadata and indexes 936 of the metadata, before replaying 938 all logs in the log image 909, including the metadata redo logs 930, the metadata logs 912, and non-metadata logs 914. Upon initializing the database image in the in-memory image 906 the structure of the non-overlapping data segment 916, 918 can be maintained in the database image so that the application of the undo logs and replay of the logs will not result in data corruption in the database image. Separate segment identification numbers can be assigned to the data segments for metadata and non-metadata to ensure that the processor can identify the separate data segments in the target memory region.

Upon replay 938 of the logs, the processor 904 then rebuilds 940 the pagelist 942 for the non-metadata and the indexes 944 for the non-metadata. In the case of physical non-metadata logs, in some embodiments, rebuilding the pagelist and indexes subsequent to the replay of the logs guarantees the consistency of the pagelist and indexes.

Figure 10:
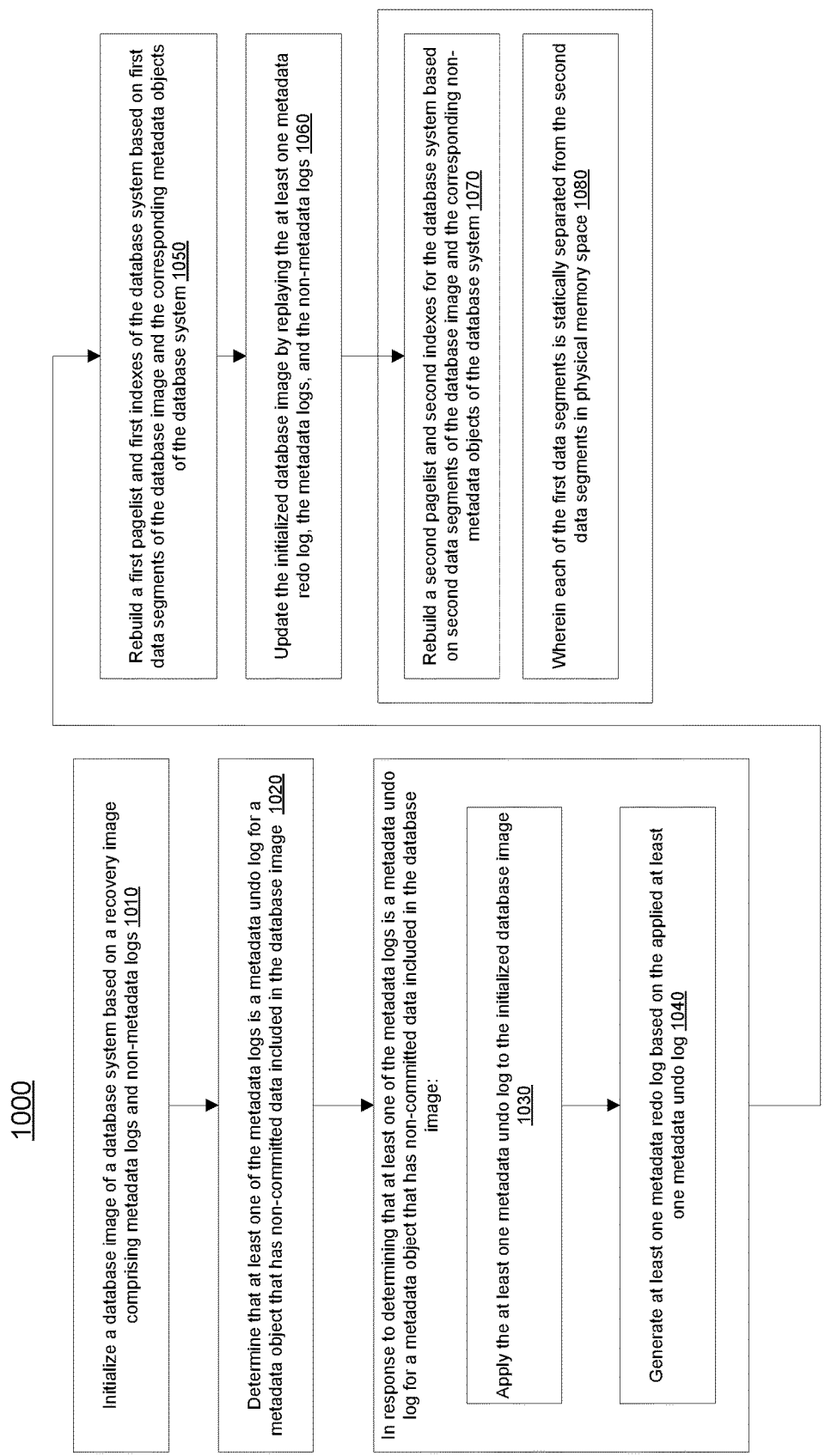
FIG. 10 illustrates a flowchart of a method for restoring a database image of a secondary database system, according to some embodiments.

FIG. 10 illustrates a flowchart 1000 of a method for restoring a database image of a secondary database system, according to some embodiments. In some embodiments, one or more processors 904, at a secondary system, initialize 1010 a database image of a database system based on a recovery image comprising metadata logs and non-metadata logs. The processors 904 determine 1020 that at least one of the metadata logs is a metadata undo log for a metadata object that has non-committed data included in the database image. In response to determining that at least one of the metadata logs is a metadata undo log for a metadata object that has non-committed data included in the database image, the processors 904 apply 1030 the at least one metadata undo log to the initialized database image and generate 1040 at least one metadata redo log based on the applied at least one metadata undo log. The processors 904 rebuild 1050 a first pagelist and first indexes of the database system based on first data segments of the database image and the corresponding metadata objects of the database system. The first data segments include data of the corresponding metadata objects. The processors 904 then updates 1060 the initialized database image by replaying the at least one metadata redo log, the metadata logs, and the non-metadata logs. Subsequently, the processors 904 rebuild 1070 a second pagelist and second indexes for the database system based on second data segments of the database image and the corresponding non-metadata objects of the database system. The second data segments include data of the corresponding non-metadata objects, and each of the first data segments is 1080 statically separated from the second data segments in physical memory space.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for restoring a database image of a secondary database system, the method comprising:

initializing, at the secondary database system, a database image of a database system based on a recovery image comprising metadata logs and non-metadata logs, at least one of the metadata logs comprising a metadata undo log for a metadata object of the database system, the metadata object having non-committed data included in the database image, the non-committed data comprising at least one of transaction data, user data, or application data;

dividing the database image into non-overlapping data segments including first data segments and second data segments, wherein the first data segments comprise the metadata objects of (i) a concurrent state of the primary database system or the secondary database system and (ii) a consistent state prior to data recovery, and wherein the second data segments comprise non-metadata objects;

applying the at least one metadata undo log to the initialized database image to revert the non-committed data to a previous committed state, wherein the non-overlapping data segments are maintained after the applying;

generating at least one metadata redo log based on the applied at least one metadata undo log;

rebuilding a first pagelist and first indexes of the database system based on first data segments of the database image and the corresponding metadata objects of the database system, the first data segments including data of the corresponding metadata objects;

after rebuilding the first pagelist and the first indexes, updating the initialized database image by replaying the at least one metadata redo log, the metadata logs, and the non-metadata logs, wherein replaying the at least one metadata redo log reverts the non-committed data back from the previous committed state to a non-committed state, wherein the non-overlapping data segments are maintained after the replaying; and after updating the initialized database image, rebuilding a second pagelist and second indexes for the database system based on second data segments of the database image and the corresponding non-metadata objects of the database system, the second data segments including data of the corresponding non-metadata objects;

wherein each of the first data segments is statically separated from the second data segments in physical memory space.

2. The method of claim 1, wherein the recovery image includes a savepoint image.

3. The method of claim 1, wherein the metadata logs are logical logs and the non-metadata logs are physical logs.

4. The method of claim 1, wherein the non-metadata objects includes at least one of user data objects, application data objects, or client data objects.

5. The method of claim 1, wherein rebuilding of a first pagelist and first indexes occurs after applying the at least one least one metadata undo log to the initialized database image.

6. The method of claim 1, wherein the first data segments comprise one or more first pages loaded from a data image of the secondary system, and the second data segments comprise one or more second pages loaded from the data volume.

7. The method of claim 1, wherein the applying the at least one undo metadata logs is independent of the replaying of the metadata logs and non-metadata logs.

8. The method of claim 1, further comprising in response to determining that at least one of the non-metadata logs is a metadata undo log for a non-metadata object of the database system, the non-metadata object having non-committed data included in the database image, applying the at least one non-metadata undo log to the initialized database image.

9. The method of claim 1, wherein the at least one metadata undo log and the at least one non-metadata undo log are applied before the rebuilding a first pagelist and first indexes of the database system.

10. The method of claim 1, wherein the database image is a row store.

11. The method of claim 1, wherein the concurrent state comprises a latest state of the primary database system or a latest persisted state stored with the secondary database system.

12. The method of claim 1, wherein in the consistent state the primary database system is identical to the secondary database system such that the metadata objects are committed to a persistent state.

13. A non-transitory computer-readable storage medium including instructions to perform operations comprising:
  initializing, at the secondary database system, a database image of a database system based on a recovery image comprising metadata logs and non-metadata logs, at least one of the metadata logs comprising a metadata undo log for a metadata object of the database system, the metadata object having non-committed data included in the database image, the non-committed data comprising at least one of transaction data, user data, or application data;
  dividing the database image into non-overlapping data segments including first data segments and second data segments, wherein the first data segments comprise the metadata objects of (i) a concurrent state of the primary database system or the secondary database system and (ii) a consistent state prior to data recovery, and wherein the second data segments comprise non-metadata objects;
  applying the at least one metadata undo log to the initialized database image to revert the non-committed data to a previous committed state, wherein the non-overlapping data segments are maintained after the applying;
  generating at least one metadata redo log based on the applied at least one metadata undo log;
  rebuilding a first pagelist and first indexes of the database system based on first data segments of the database image and the corresponding metadata objects of the database system, the first data segments including data of the corresponding metadata objects;
  after rebuilding the first pagelist and the first indexes, updating the initialized database image by replaying the at least one metadata redo log, the metadata logs, and the non-metadata logs, wherein the non-overlapping data segments are maintained after the replaying; and
  after updating the initialized database image, rebuilding a second pagelist and second indexes for the database system based on second data segments of the database image and the corresponding non-metadata objects of the database system, the second data segments including data of the corresponding non-metadata objects;
  wherein each of the first data segments is statically separated from the second data segments in physical memory space.

14. A computer-implemented database recovery system, the system comprising:
  one or more data processors; and
  a non-transitory computer-readable storage medium encoded with instructions for commanding the one or more data processors to perform operations comprising:
    initializing, at the secondary database system, a database image of a database system based on a recovery image comprising metadata logs and non-metadata logs, at least one of the metadata logs comprising a metadata undo log for a metadata object of the database system, the metadata object having non-committed data included in the database image, the non-committed data comprising at least one of transaction data, user data, or application data;
    dividing the database image into non-overlapping data segments including first data segments and second data segments, wherein the first data segments comprise the metadata objects of (i) a concurrent state of the primary database system or the secondary database system and (ii) a consistent state prior to data recovery, and wherein the second data segments comprise non-metadata objects;
    applying the at least one metadata undo log to the initialized database image to revert the non-committed data to a previous committed state, wherein the non-overlapping data segments are maintained after the applying;
    generating at least one metadata redo log based on the applied at least one metadata undo log;
    rebuilding a first pagelist and first indexes of the database system based on first data segments of the database image and the corresponding metadata objects of the database system, the first data segments including data of the corresponding metadata objects;

after rebuilding the first pagelist and the first indexes, updating the initialized database image by replaying the at least one metadata redo log, the metadata logs, and the non-metadata logs, wherein replaying the at least one metadata redo log reverts the non-committed data back from the previous committed state to a non-committed state, wherein the non-overlapping data segments are maintained after the replaying; and after updating the initialized database image, rebuilding a second pagelist and second indexes for the database system based on second data segments of the database image and the corresponding non-metadata objects of the database system, the second data segments including data of the corresponding non-metadata objects;

wherein each of the first data segments is statically separated from the second data segments in physical memory space.

15. The system of claim 14, wherein the recovery image includes a savepoint image.

16. The system of claim 14, wherein the metadata logs are logical logs and the non-metadata logs are physical logs.

17. The system of claim 14, wherein the non-metadata objects includes at least one of user data objects, application data objects, or client data objects.

18. The system of claim 14, wherein rebuilding of a first pagelist and first indexes occurs after applying the at least one least one metadata undo log to the initialized database image.

19. The system of claim 14, wherein the first data segments comprise one or more first pages loaded from a data image of the secondary system, and the second data segments comprise one or more second pages loaded from the data volume.

20. The system of claim 14, wherein the database image is a row store.

* * * * *